United States Patent

Bardet

[15] 3,643,966
[45] Feb. 22, 1972

[54] SHAFT PACKING

[72] Inventor: Jean-Claude Bardet, Puteaux, France

[73] Assignee: Societe Internationale de Mecanique Industrielle S.A., Luxembourg

[22] Filed: June 8, 1970

[21] Appl. No.: 44,199

[30] Foreign Application Priority Data

July 29, 1970    France..................................6925890

[52] U.S. Cl..............................................277/80, 277/43
[51] Int. Cl. ......................................F16j 9/00, E21b 33/00
[58] Field of Search......................277/80, 42, 88, 43, 90, 40

[56] References Cited

UNITED STATES PATENTS

| 2,474,123 | 6/1949 | Schmitz | 277/43 |
| 2,824,760 | 2/1958 | Gits | 277/40 |
| 2,899,219 | 8/1959 | Payne | 277/43 |

Primary Examiner—Samuel B. Rothberg
Attorney—Robert E. Burns and Emmanuel J. Lobato

[57] ABSTRACT

A shaft packing characterized in that it is capable of transmitting electric current, whether direct or alternating, from the fixed member to the rotary member; this possibility is particularly advantageous in case it is desired to control an electromagnetic device solid with the aforesaid rotary member.

1 Claims, 3 Drawing Figures

SHAFT PACKING

BACKGROUND OF THE INVENTION

This invention relates in general to packings or seals of the type adapted to be mounted between a rotary member and a fixed member and having its component elements disposed in a case to be fitted, when assembling these members, in a cavity formed in one of said members, the connecting member between this case and the friction ring consisting of a diaphragm of flexible material, a coil spring reacting against said case and constantly exerting a resilient force against the friction ring.

SUMMARY OF THE INVENTION

It is the object of this invention to provide a shaft packing of the type broadly set forth hereinabove which is characterized in that it is capable of transmitting electric current, whether direct or alternating, from the fixed member to the rotary member; this possibility is particularly advantageous in case it is desired to control an electromagnetic device solid with the aforesaid rotary member.

To this end an electric connection is provided between the metal case of the seal or packing and the friction ring made of conducting material, this connection being effected either through the pressure spring or through a separate bridgepiece or connecter specially provided to this end.

BRIEF DESCRIPTION OF THE DRAWING

The attached drawing illustrates diagrammatically three different forms of embodiment of this invention. In the drawing.

DESCRIPTION OF THE PREFERRED EMBODIMENT

Figure 1:
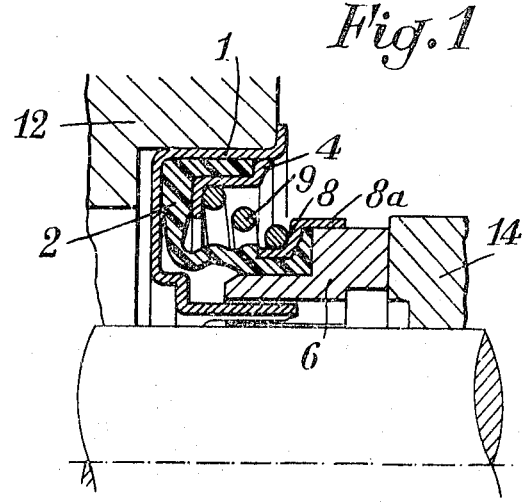
FIG. 1 is a fragmentary radial section showing a first form of embodiment.

The annular case 1 having a substantially U-shaped radial section with the branches of the U substantially parallel to the case axis is connected to the friction ring 6 through an annular diaphragm 2 of suitable elastomeric material, which has similarly a substantially U-shaped radial section. A tapered coil compression spring 9 bears with one end against the reinforcing ring 4 and with the opposite end against the other reinforcing ring 8; the case 1 is force-fitted in a suitable cavity formed in the fixed member or casing 12, the coil spring 9 urging the outer face of friction ring 6 against a shoulder portion of rotary member 14.

In the form of embodiment illustrated in FIG. 1, the reinforcing ring 4 is in constant electric contact with the packing case 1, and the other reinforcing ring 8 is likewise in constant electric contact with the friction ring 6, whereby electric current can be transmitted from the fixed member 12 to the movable member 14 through packing case 1, reinforcing ring 4, coil spring 9, the other reinforcing ring 8 and friction ring 6. The electric contact between reinforcing ring 8 and friction ring 6 may be obtained by using a plurality of strips 8a constituting adequate extensions of ring 8 and surrounding the cylindrical outer surface of friction ring 6.

Figure 2:
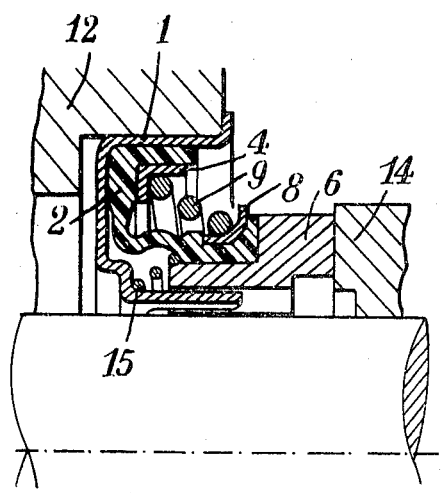
FIGS. 2 and 3 are similar views showing two other forms of embodiment.
Figure 3:
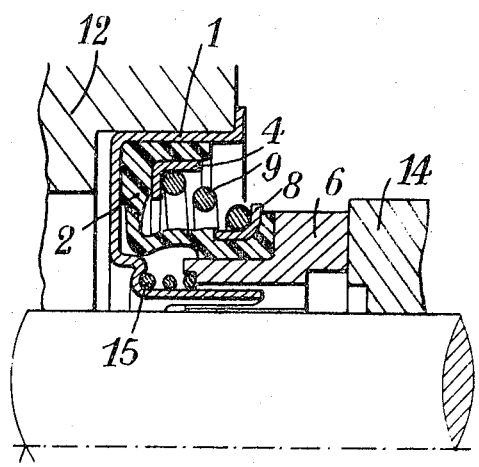

In the forms of embodiment illustrated in FIGS. 2 and 3 a separate bridgepiece connecting member, strip or coil 15 is interposed directly between the case 1 and friction ring 6.

Of course, the forms of embodiment described hereinabove are given by way of example only and should not be construed as limiting the present invention, since many modifications may be brought thereto without departing from the spirit and scope of the present invention.

What I claim is:

1. A shaft packing adapted to be mounted between a rotary member and a fixed member of a mechanism to be sealed, which comprises a case adapted to be force-fitted in a cavity formed in one of the members of the mechanism to be sealed, a friction ring adapted to be resiliently pressed against the other member of the mechanism to be sealed, a diaphragm of flexible material providing the necessary tightness between said case and said friction ring, a first reinforcing ring holding one end of said diaphragm against said case, another reinforcing rig holding the opposite end of said diaphragm against said friction ring, a first coil compression spring disposed between said reinforcing rings so as to urge them away from each other, and a second coil between the first reinforcing ring and the friction ring to constitute an electric connection between the rotary member and the fixed member.

* * * * *